No. 672,422. Patented Apr. 16, 1901.
T. P. OWEN.
STRAW TWINE MECHANISM FOR SELF BINDERS.
(Application filed July 18, 1900)
(No Model.) 3 Sheets—Sheet 1.
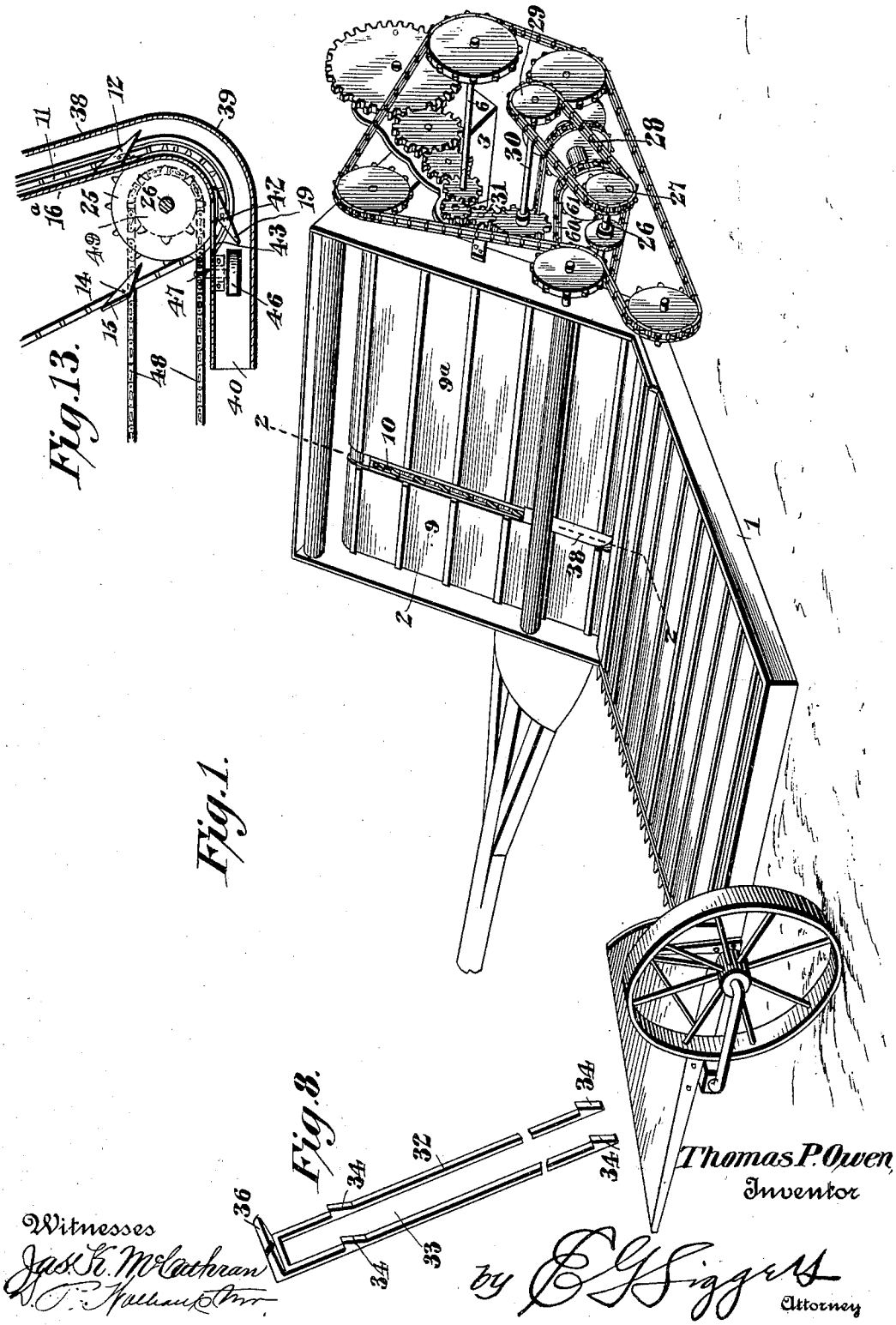
Thomas P. Owen,
Inventor

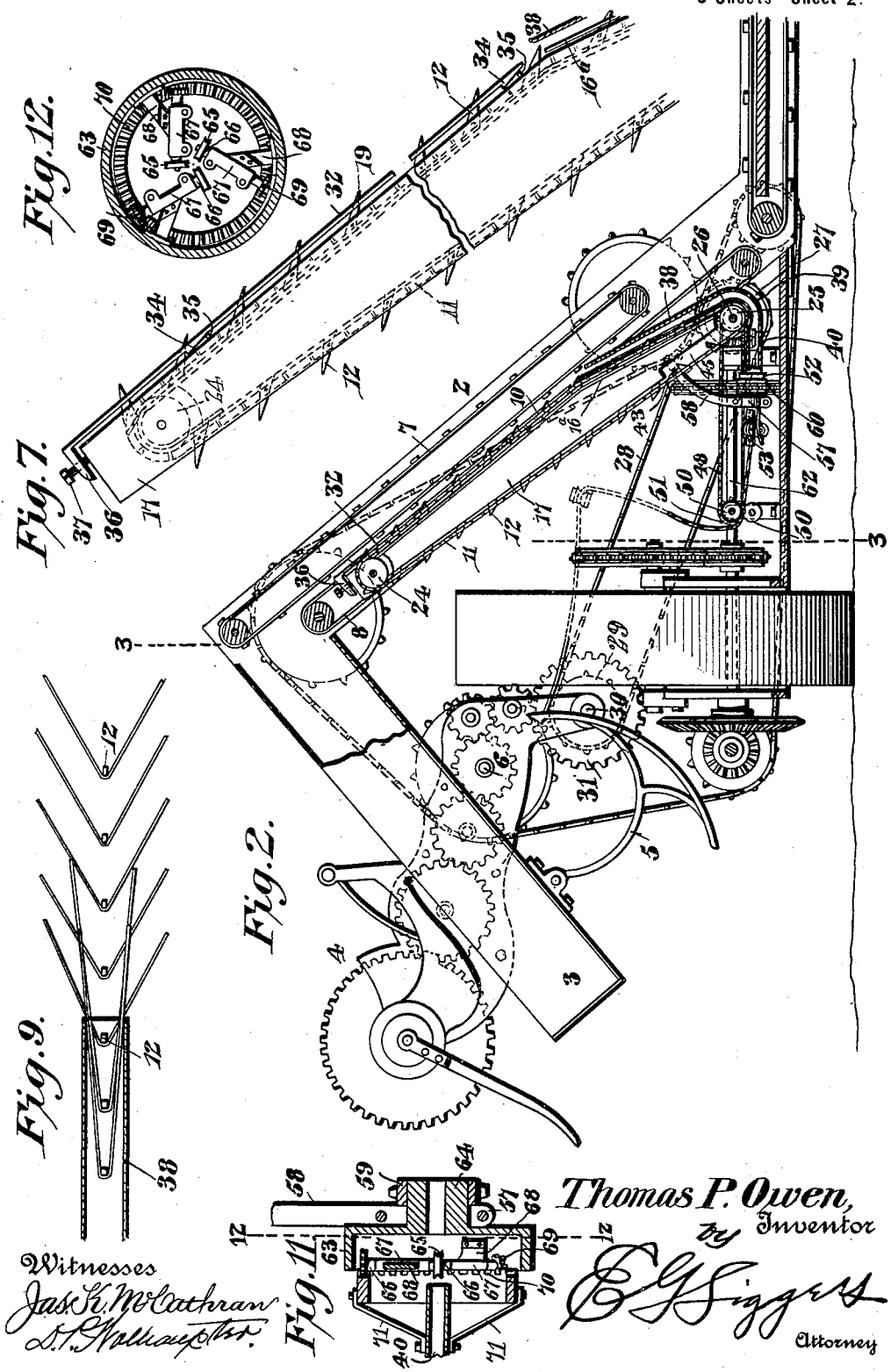

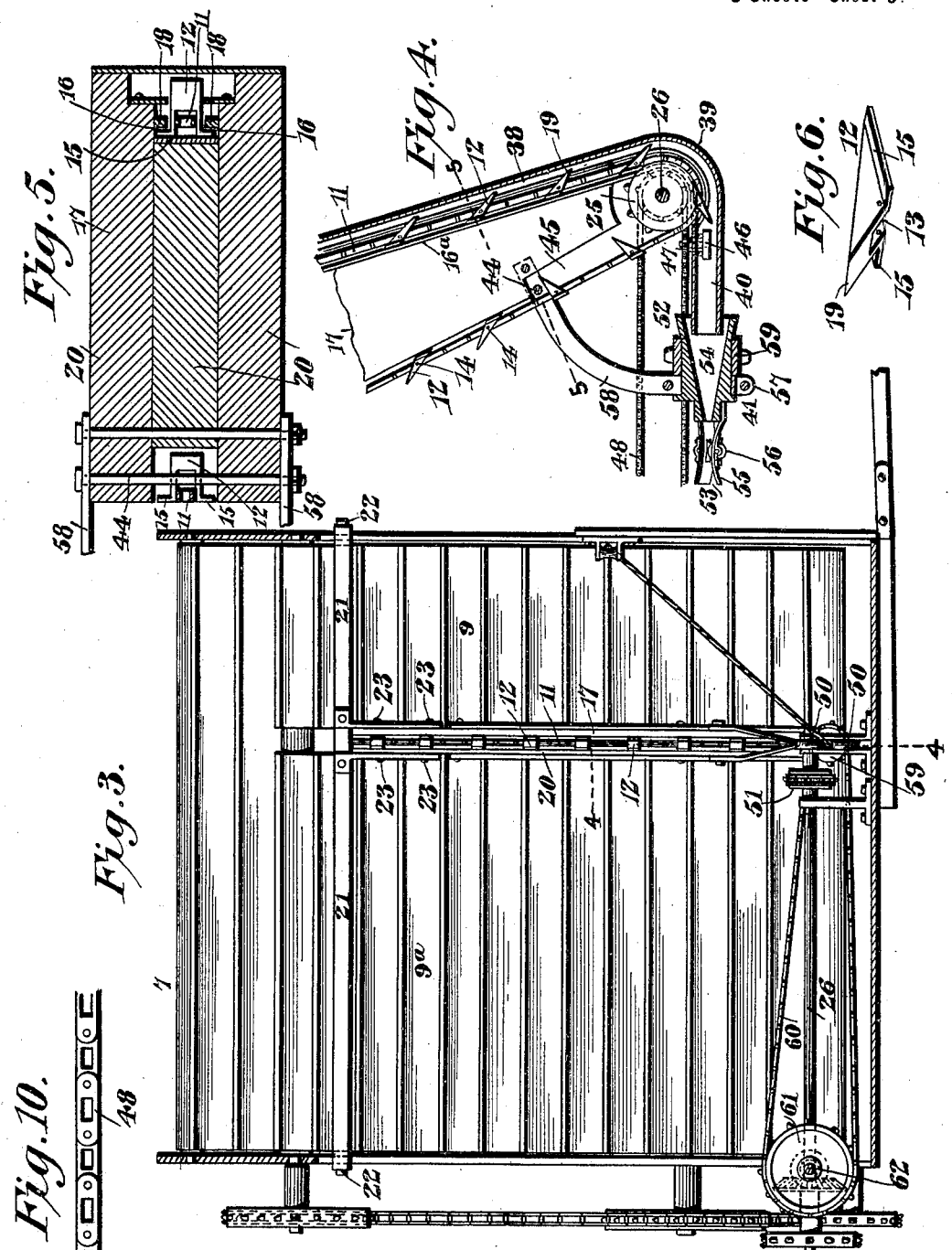

UNITED STATES PATENT OFFICE.

THOMAS P. OWEN, OF YORK, NEBRASKA, ASSIGNOR OF ONE-TENTH TO FREDERICK R. CLARK, OF SAME PLACE.

STRAW-TWINE MECHANISM FOR SELF-BINDERS.

SPECIFICATION forming part of Letters Patent No. 672,422, dated April 16, 1901.

Application filed July 18, 1900. Serial No. 24,104. (No model.)

*To all whom it may concern:*

Be it known that I, THOMAS P. OWEN, a citizen of the United States, residing at York, in the county of York and State of Nebraska, have invented a new and useful Straw-Twine Mechanism for Self-Binders, of which the following is a specification.

This invention relates to harvesting machinery, and has special reference to that type of machines known as "straw-binding harvesters" and involving means for forming a straw twine or rope to be utilized in the binding of the bundles.

To this end the invention primarily has in view the provision of a novel form of twine-making mechanism applicable to any of the ordinary types of self-binding harvesters and providing simple and reliable means for making the binding-twine out of straw during the operation of the machine. In other machines of this class, including means for forming a straw twine or rope, many changes in the structural formation of the different parts of the binder have been necessary to provide for carrying out the operation of making the binding twine or rope, whereas in the present invention the twine-making mechanism is really in the nature of an attachment to any ordinary self-binder and requires no change whatever in the binding and knotting mechanism, except in the size thereof, nor in any other part of the harvester, with the exception of the lower elevator-apron, which is somewhat modified to admit of an effective positioning of the strand-gatherer forming a part of the mechanism.

Another object of the invention is to provide an improved straw-twine-making mechanism geared directly to the binding mechanism so as to operate synchronously therewith—that is, to be in operation with the binding mechanism—and also to remain inactive or at rest therewith.

With these and many other objects in view, which will more readily appear as the nature of the invention is better understood, the same consists in the novel construction, combination, and arrangement of parts hereinafter more fully described, illustrated, and claimed.

The essential features of the invention involving the novel arrangement of the strand-gatherer and the relation of the same to the twisting device, besides the other fundamental features of the invention, are necessarily susceptible to a wide range of modification without departing from the spirit or scope of the invention; but the preferred embodiment of the improvements is shown in the accompanying drawings, in which—

Figure 1 is a general perspective view of a self-binding harvester with the upper elevator-apron removed to expose the novel arrangement of the strand-gatherer at a point intermediate the sides of the elevator-frame. Fig. 2 is a vertical sectional view of the portions of the harvester with which the twine-making mechanism is associated, said view being taken on the line 2 2 of Fig. 1. Fig. 3 is a vertical transverse sectional view on the line 3 3 of Fig. 2, exposing the under side of the lower elevator-apron and the manner of supporting the strand-gatherer in position. Fig. 4 is an enlarged detail sectional view showing the contiguous portions of the strand-gatherer, the bunching-chute, and the twisting device, said view being taken on the line 4 4 of Fig. 3. Fig. 5 is a detail cross-sectional view of the supporting-frame of the strand-gatherer on the line 5 5 of Fig. 4. Fig. 6 is a detail in perspective of one of the strand collectors or hooks carried by the conveyer of the strand-gatherer. Fig. 7 is a detail sectional view of the upper portion of the strand-gatherer and its supporting-frame, illustrating more plainly the mounting of the strand-gage for regulating the amount of straw gathered by the gatherer. Fig. 8 is a detail in perspective of the preferable form of strand-gage which is employed. Fig. 9 is a detail diagrammatic view illustrating the loops formed in the strands by the successive collectors and the manner in which the successive strand-loops are folded or bunched together as the same are carried into the bunching-chute. Fig. 10 is a detail in perspective of a short section of the multi-faced chain employed in connection with the driving of the feeder and delivery rollers associated with the twister or twisting device of the mechanism. Fig. 11 is a detail sectional view of another form of twister device which might be employed in carrying out the invention. Fig. 12 is a sectional view of the second form of twisting device on the line 12 12 of Fig. 11. Fig. 13 is an enlarged detail sectional view of the lower end portion of the strand-gatherer and the contiguous parts.

Like numerals of reference designate corresponding parts in the several figures of the drawings.

In carrying out the invention the twine-making mechanism constituting the same may be applied, as already explained, to any of the ordinary types of self-binding harvesters without change or modification thereof in any respect excepting the lower elevator-apron, to which particular reference will presently be made, and except to make the knotter-head and needle larger. Hence for illustrative purposes there is shown in the drawings an ordinary form of self-binding harvester fitted with the twine-making mechanism contemplated by the present invention. This harvester embodies the usual elements and, generally speaking, comprehends the ordinary platform 1, the inclined elevator 2, arising from one end of the platform and receiving the grain from the platform-apron, and the binding-deck 3, declining from the upper end of the elevator 2 in the usual relation. Associated with the binding-deck 3 of the harvester is the usual binding mechanism 4, which includes the threading-needle 5, constituting a part of the knotter, and as this binding mechanism is of the usual construction and operates in the ordinary way a specific description thereof is unnecessary; but it may be stated at this point that one of the objects of the invention is to so associate the twine-making mechanism with the binding mechanism as to provide for the synchronous activity and inactivity of said two mechanisms, and this result is preferably secured by transferring motion to both mechanisms from the usual driving-shaft 6 for the binding mechanism. This driving-shaft 6 constitutes a part of the gearing of an ordinary self-binder, and the manner of utilizing the same to transfer motion to the twine-making mechanism, as well as to the binding mechanism, will be hereinafter referred to.

The elevator 2 of the harvester comprehends the usual upper and lower inclined elevator-aprons 7 and 8, respectively, which are located one above the other and perform their functions in the usual way to provide for elevating the grain from the harvester-platform to the binding-deck; but in carrying out the present invention a slight modification of the lower elevator-apron 8 is resorted to in order to provide for the positioning of the strand-gatherer, so that it will collect strands of straw within the elevator and in such a way as to partially loop the strands, whereby the same may be readily bunched or folded into compact form, ready for the twisting operation. The modification of the lower elevator-apron 8 simply consists in dividing the said apron longitudinally into separate sections 9 and $9^a$, which are mounted in the same transverse plane and pass over the apron-rollers in the usual way; but the said apron-sections 9 $9^a$ are spaced apart sufficiently at their contiguous edges to permit of the interposition in the interval therebetween of the strand-gatherer 10, which provides for the collecting of the necessary quantity of straw for the formation of the same into the twine or rope for binding purposes, thereby dispensing with the necessity of the ordinary binding-twine. The strand-gatherer 10, which is arranged in the interval between the lower elevator-apron sections 9 $9^a$, extends longitudinally of the said lower elevator-apron substantially the entire length thereof, and the said gatherer essentially comprises an endless conveyer 11, preferably in the form of a sprocket-chain, and a plurality or endless series of regularly-spaced strand-collectors 12, carried by the said conveyer. It is of course not essential to the successful carrying out of the invention what particular form of endless conveyer 11 is employed, although a sprocket-chain has been found well adapted for the purpose; but the strand-collectors 12 must be so constructed and arranged as to provide for positively engaging a number of strands of the straw in such a way as to form a bight or loop therein and then positively carry the same to the twisting device through the intermediate parts of the mechanism; but a preferable type of strand-collectors is illustrated in detail in Fig. 6 of the drawings, and referring to this figure it will be seen that each strand-collector 12 is usually in the form of a triangular-shaped hook, provided at one of its angles with the bifurcation 13, receiving therein the conveyer-chain 11, to which chain the hook is pivoted by means of a pivot-pin 14, passing transversely through the bifurcated portion 13 and also through the link of the chain lying within said bifurcation. This manner of mounting each collector provides for a pivotal mounting thereof, which facilitates its disengagement from the straw at the proper point, and in addition to the features described the body of each collector is provided at the opposite side edges of one of its inclined faces with laterally-projecting holding-flanges 15, which are adapted to slidably interlock within a grooved track 16, formed in the outer side of the longitudinally-arranged supporting-frame 17 for the strand-gatherer. The said grooved track 16, which is formed at the outer side of the supporting-frame 17, extends longitudinally of this frame the full length thereof and is formed with inturned retaining-flanges 18, which overhang the holding-flanges 15 of the hooks or collectors 12 at the front side of the frame, and thus provide means for positively holding the collectors carried by the outer run of the frame 11 in a position with one end thereof projecting outwardly from the conveyer to constitute an engaging point 19 for engaging and holding the strands of straw. The said supporting-frame 17 for the strand-gatherer is arranged longitudinally within the interval between the sections 9 9ª of the lower elevator-apron, and while this frame may be of any form, so long as it is provided with the necessary parts coöperating with the strand-gatherer, still, in the drawings, one form of the supporting-frame is shown as consisting of a plurality of frame-strips 20, arranged side by side in parallel relation and secured together by bolts or other fastening means, and to provide for holding the said frame 17 in the proper position for locating the strand-gatherer within the interval between the lower elevator-apron sections, suitable sustaining brackets or braces 21 may be employed, which brackets or braces may be conveniently fastened to opposite sides of the elevator-frame, as indicated at 22, and secured at their inner ends, as at 23, to opposite sides of the said frame 17. The frame 17 also supports the oppositely-located upper and lower conveyer-wheels 24 and 25, around which the conveyer-chain 11 is passed. The upper of said wheels 24 is an idler to sustain the upper end portion of the conveyer-chain 11, while the lower of said wheels 25 is a sprocket or chain wheel to provide for driving or transferring motion to the chain 11 and is mounted upon a countershaft 26, journaled in suitable bearings in rear of the lower end portion of the elevator and carrying at one end a sprocket-wheel 27, receiving a chain 28, driven from a sprocket-wheel 29, mounted on the outer extremity of a driven shaft 30, also journaled in suitable bearings in rear of the elevator and geared by a train of gears 31 with the aforesaid drive-shaft 6 for the binding mechanism, thus completing a train of gearing which provides for transferring motion from the drive-shaft 6 for the binding mechanism to the countershaft 26, which serves to communicate motion to the conveyer or conveyer-chain of the strand-gatherer. Consequently when the binding mechanism is in operation the strand-gatherer is in operation, and vice versa.

The strand-collectors 12, carried by the outer run of the chain 11, are held by the track 16, with their engaging points 19 projecting outwardly a sufficient distance beyond the plane of the lower elevator-apron, so as to freely engage with the straw upon such apron, and in order to gage the projection of said engaging points 19 beyond the plane of the lower elevator-apron, so as to regulate the quantity of straw gathered by the strand-gatherer, there is associated with said gatherer a suitable form of strand-gage, which is adjustable toward and away from the plane of the outer side of the lower elevator-apron to secure the desired result. A preferable construction of strand-gage is illustrated in the drawings, and essentially consists of a plate or slide 32, having a longitudinal slot or bifurcation 33 extending the full length thereof to permit of the same straddling the outer run of the conveyer-chain and the collector-hooks carried thereby. The said longitudinally-bifurcated gage plate or slide 32 is arranged upon the outer side of the supporting-frame 17 for the strand-gatherer, and the side portions of the said plate or slide are located, respectively, at opposite sides of the plane of the guiding-track 16 for the collector-hooks, and to provide for the adjustment of the side portions of the gage plate or slide toward and away from the plane of the lower elevator-apron the said side portions are provided at their under sides with a plurality of wedge inclines 34, adapted to ride upon rest projections or pins 35 on the outer side of the frame 17. (See Fig. 7.) At its outer end the said gage plate or slide 32 is provided with a supporting lug or flange 36, having a threaded opening therein receiving the adjusting-screw 37, engaging with the upper end of the supporting-frame 17 to provide for the longitudinal movement of the said plate or slide. It will be obvious that upon a longitudinal movement of the gage plate or slide 32 the wedge inclines 34 thereof, riding upon the projections or pins 35, will necessarily cause the plate or slide to move in a direction toward or away from the outer side of the frame 17, and will consequently vary the projection of the engaging points 19 of the collectors beyond the face of the gage. At this point it will be observed that the side portions of the gage plate or slide lie close to the sides of the collector-hooks, and consequently accurately determine the quantity of straw which may be caught and carried by the said hooks.

The lower portion of the guiding-track 16 for the outer or active series of collector-hooks 12 is inclined, as indicated at 16ª, so as to extend obliquely across the interval between the outer and inner runs of the lower elevator-apron, and thus carry the outer run of the conveyer-chain to the rear of the lower elevator-apron at the lower end thereof to facilitate the gearing up of the different parts, besides obviating interference with the passage of the grain from the platform-apron onto the elevator.

The lower portion of the outer run of the conveyer-chain 11, which carries the active collector-hooks 12, travels through what may be properly termed a "bunching-chute 38," and in the construction shown in the drawings this bunching-chute follows the inclination of the lower inclined portion 16ª of the track and is of a tubular form, so as to extend around and house in the said lower inclined portion of the outer run of the conveyer-chain 11, and the said chute 38 is also provided with a curved portion 39, which circles around the lower end portion of the strand-gatherer concentrically with the lower conveyer or sprocket-wheel 25, as plainly shown in Figs. 2 and 4 of the drawings, and at this point the said bunching-chute 38 is extended into a feeding-spout 40, which projects in a rearward direction from the lower end portion of the strand-gatherer and serves to feed the closely-bunched strands of straw into the twister or twisting device 41, which will be presently described. At the point where the bunching-chute 38 curves into the feeding-spout 40 it is necessary to trip or tilt the active collectors carrying the strands of straw, so as to entirely free or disengage them from the strands to permit the latter to be freely fed through the spout 40 into the twister 41. This result may be accomplished by any suitable form of trip device for tilting the collecting-hooks back out of the way, and one means of accomplishing this result is shown in the drawings and consists in providing the guiding-track 16 at its extreme lower end, beneath the lower conveyer-wheel, with a clearance-opening 42, which permits the holding-flanges of the collector-hooks to free themselves, and contiguous to this point is arranged a fixed trip element or abutment 43, with which the inclined side of the collecter-hooks becomes engaged, thus causing the said hooks to be tilted backward within the conveyer-chain as the latter moves around, thus causing the said hooks to become disengaged or tripped from the strands of straw which they carry. After passing the tripping-point, where the bunching-chute leads into the feeding-spout 40, the inwardly-projecting points of the inactive collector-hooks pass into engagement with the resetting stop or pin 44, located within a groove 45 within the rear lower end portion of the frame 17. This resetting stop or pin 44 serves to tilt the collecting-hooks 12 back into their normal position, so that the holding-flanges thereof will reënter the track 16 at the upper end of the frame when they reach this point.

The passage of the bunched straw through the feeding-spout 40 is facilitated by means of feeder-rollers 46, working in slots in the sides of the feed-spout and projecting sufficiently within the latter to engage with the body or bunch of straw to carry it toward the twister 41, and to secure a positive operation of the feeder-rollers 46 one of the same has mounted on one of its shaft extremities a pinion 47, engaging with a side face of the multifaced driving-chain 48. (Illustrated in detail in Fig. 10 of the drawings.) This driving-chain receives its motion from the sprocket-wheel 49 on the counter-shaft 26, which drives the strand-gatherer (see Fig. 13) and is also utilized to transfer motion to the peripherally-grooved delivery-rollers 50, arranged beyond the twister to receive the formed twine or rope and to assist in drawing the same through the mechanism. The delivery-rollers 50 are arranged in superposed relation one above the other, and the shaft of one of said rollers carries a chain-wheel 51, over which the multifaced driving-chain 48 passes, as may be best seen in Figs. 2 and 3 of the drawings.

Different forms of twisters may be utilized in carrying out the invention, the twister performing the function of spirally rolling or twisting the bunched strands to provide a substantial twine or rope which may be worked in the knotting mechanism in the same way as ordinary twine, and one form of twister 41 is shown in Figs. 2 and 4 of the drawings. This twister essentially consists of a rotatable former 52 and a plurality of twisting elements 53, extended from one end of the former. The said former 52 of the twister 41 is provided with a flaring or conical bore 54, the wide end of which receives therein the feeding-spout 40, and the twisting elements 53 are extended beyond and rigidly fitted to the contracted end of the former. The said twisting elements 53 are preferably in the form of a plurality of pressure-springs 55, arranged in a circular group and longitudinally disposed with reference to the former. The said pressure or twister springs 55 consist of short sections of spring metal, and each has journaled therein at an intermediate point a revoluble twisting-roller 56, whose axis is disposed transversely with reference to the springs, so that as the twister is rotated the said twisting-rollers move with the twister sidewise, so that their rounded peripheries will work about the straw and cause the same to be rolled or twisted spirally. The said rollers by reason of having their axes transverse to the length of the springs carrying the same are free to rotate and roll upon the straw twine or rope as it is drawn out of the twister. The passage-way within the circular group of twister-springs 55 is longitudinally alined with the passage-way through the former 52, and the said former is in direct communication with the feeding-spout 40, so as to receive the straw therefrom. On account of the tapering or conical shape of the bore of the former the already bunched or folded straw fed out of the spout 40 is more closely bunched, with the strands compactly pressed together as it passes out of the apex of the former 52 and enters the passage-way within the circle of the twisting-springs 55. The entire twister 41, consisting of the former 52 and the twisting elements 53, is capable of free rotation and is positively driven. To secure this result, the former 52 is loosely journaled in a bearing 57, formed in the lower end of a bracket 58, pendent from the lower portion of the supporting-frame 17. The said former 52 has fitted thereon a chain-wheel 59, receiving a driving-chain 60. This driving-chain 60 receives its motion from a chain-wheel 61, mounted on the short counter-shaft 62, mounted in bearings at one side of the machine, and having a gear connection with the counter-shaft 26, so as to also receive its motion from the aforesaid driving-shaft 6 for the binding mechanism.

Other forms of twisters might be substituted for the one already described. So for illustrative purposes there is shown a second form of twister in Figs. 11 and 12 of the drawings. This twister comprehends a rotatable head 63, having a collar 64 journaled in the aforesaid bearing 57, which collar carries the chain-wheel 59, which receives motion from the sprocket-chain 60. The said rotatable head 63 carries therein a circular group of peripherally-grooved twisting-rollers 65, which are disposed radially with reference to the axis of the head and arranged in regular spaced relation concentric with the axis of rotation of the head. Each of the said twisting-rollers 65 is mounted on the inner end of a short roller-shaft 66, journaled in a sleeved bearing 67, supported by the bracket 68, secured fast to the inner side of the head 63, which is in the form of an open ring. In order to maintain a proper relative arrangement of the twisting-rollers 65, the bearings 67, as well as the roller-shafts 66, are disposed tangentially to the axis of the rotatable head 63 and carry at their outer ends the pinions 69, which mesh with an angle-toothed gear-ring 70. This gear-ring 70 is stationary and may be conveniently supported upon the feed-spout 40 by means of the supporting braces or arms 71, as plainly shown in Fig. 11 of the drawings. It will be seen that the rotation of the twister-head 63 not only provides for carrying the twisting-roller 65 circularly about the straw, but at the same time a positive motion is imparted to the said rollers to cause the same to feed the straw through the twister.

The completed straw twine or rope after leaving the delivery-rollers 50 is guided by suitable means to the needle 5 of the binding mechanism and is manipulated by this mechanism in the usual way.

When the binding mechanism is in operation, motion is transmitted to the strand-gatherer 10, as well as to the twister, through the medium of the connections already described, and the collector-hooks 12 of the strand-gatherer will engage with the strands of the straw upon the elevator at an intermediate point, and by reason of the outer run of the strand-gatherer traveling in a downward direction opposite to the direction of travel of the lower elevator-apron bights or partial loops are formed in the strands of straw to form strand loops, as plainly shown in diagrammatic Fig. 9 of the drawings. These loop-strands are successively carried into the mouth at the upper end of the bunching-chute 38, and as they enter this chute the said loop-strands are caused to be closely bunched or folded together and carried in this condition into the feed-spout 40, from which the material is delivered into the twister and subjected to the twisting operation, which causes a spiral rolling or twisting of the bunched strands and at the same time exerts sufficient compression thereon to form compact straw twine or rope which may be utilized for binding purposes in the manner explained.

From the foregoing it is thought that the construction, operation, and many advantages of the herein-described twine-making mechanism for self-binders will be readily apparent to those familiar with the art without further description, and it will be understood that various changes in the form, proportion, and minor details of construction may be resorted to without departing from the principle or sacrificing any of the advantages of this invention.

Having thus described the invention, what is claimed as new, and desired to be secured by Letters Patent, is—

1. In a straw-twine-making mechanism for self-binders, the combination with the lower elevator-apron, of a strand-gatherer arranged in substantially the plane of said apron, and having its active portion exposed for action above the ascending run thereof, and twisting means, substantially as set forth.

2. In a straw-twine-making mechanism for self-binders, the combination with the elevator, of a strand-gatherer having its active portion interposed in the path of the grain between the upper and lower aprons, and moving in a contrary direction to the ascending runs of the elevator.

3. In a straw-twine-making mechanism for self-binders, the combination with the lower elevator-apron, of a strand-gatherer arranged in substantially the plane of said apron, and having its active portion exposed above the ascending run thereof, and traveling in a contrary direction to said run, and twisting means.

4. In a straw-twine-making mechanism for self-binders, the combination with the elevator, of a traveling strand-gatherer arranged within the elevator-frame and having its active portion moving in a contrary direction to the ascending run of the elevator, and twisting means.

5. In a straw-twine-making mechanism for self-binders, the combination with the binding mechanism and the elevator, of a strand-gatherer arranged within the elevator-frame and having its active portion moving in a contrary direction to the ascending runs of the elevator-aprons, a twister, and means for simultaneously operating the binding mechanism, the strand-gatherer, and the twister, substantially as set forth.

6. In a straw-twine-making mechanism for self-binders, the combination with the elevator, of a traveling strand-gatherer arranged inside of the elevator-frame and disposed longitudinally of the elevator-apron, said gatherer being located at a point intermediate the sides of the elevator-frame, and comprising means for gathering the grain during its elevation by the elevator and conveying it therefrom in the reverse direction to its ascent within the elevator.

7. In a straw-twine-making mechanism for self-binders, the combination with the elevator, of a strand-gatherer arranged within the elevator-frame and having its active portion coöperating with the lower elevator-apron and traveling in a contrary direction thereto, and twisting means, substantially as set forth.

8. In a straw-twine-making mechanism for self-binders, the combination with an elevator having an apron formed in sections, of a traveling strand-gatherer arranged in the interval between the apron-sections and traveling in a contrary direction thereto.

9. In a straw-twine-making mechanism for self-binders, the combination of an elevator whose lower apron is formed in sections, a strand-gatherer interposed between said apron-sections, and twisting means, substantially as set forth.

10. In a straw-twine-making mechanism for self-binders, the combination with the elevator of the machine whose lower apron is formed in sections, of a strand-gathering device interposed between said apron-sections and extending longitudinally thereof, and twisting means, substantially as described.

11. In a straw-twine-making mechanism for self-binders, the combination with the elevator of the machine, whose lower apron is formed in sections, of a traveling strand-gatherer arranged in the interval between said apron-sections, and twisting means for the gathered strands, substantially as set forth.

12. In a straw-twine-making mechanism for self-binders, the combination with the elevator of the machine, whose lower apron is formed in sections, of a traveling strand-gatherer arranged in the interval between said apron-sections and traveling in the contrary direction thereto, substantially as set forth.

13. In a straw-twine-making mechanism for self-binders, the combination with the elevator-aprons, of an endless strand-gatherer arranged longitudinally of the elevator-frame and having collecting elements exposed for action in the interval between the upper and lower elevator-aprons and traveling in a contrary direction to the ascending runs thereof, and twisting means for the gathered strands, substantially as set forth.

14. In a straw-twine-making mechanism for self-binders, the combination with the lower elevator-apron formed in sections, of a strand-gatherer arranged longitudinally in the interval between the apron-sections, and essentially comprising an endless conveyer, and a plurality of collecting elements carried thereby, and twisting means for the gathered strands.

15. In a straw-twine-making mechanism for self-binders, the combination with the lower elevator-apron formed in sections, of a strand-gatherer arranged in substantially the plane of said apron in the interval between the sections thereof, said gatherer essentially comprising an endless conveyer, and a plurality of collecting elements carried by said conveyer and arranged to have an operative projection beyond the plane of the active elevating side of the apron, and twisting means.

16. In a straw-twine-making mechanism for self-binders, the combination with the elevator, of a traveling strand-gatherer carrying collecting elements arranged to have a projection beyond the plane of the elevating portion of the elevator, and a gage coöperating with the active collecting elements to vary the quantity of material caught thereby.

17. In a straw-twine-making mechanism for self-binders, the combination with the elevator-apron, of a traveling strand-gatherer carrying collecting elements arranged to have a projection beyond the plane of the ascending run of the apron, and a gage coöperating with the active collecting elements to vary the quantity of material caught thereby.

18. In a straw-twine-making mechanism for self-binders, the combination with the elevator-apron, of a traveling strand-gatherer coöperating with said apron and carrying collecting elements having an operative projection beyond the plane of the ascending run of the apron, and an adjustable gage coöperating with the active collecting elements of the gatherer, and twisting means associated with said gatherer.

19. In a straw-twine-making mechanism for self-binders, the combination with the elevator-apron, of a supporting-frame, an endless traveling strand-gatherer arranged upon said supporting-frame and carrying collecting elements for the strands, and an adjustable strand-gage also mounted upon said frame and arranged to vary the active projection of the collecting elements beyond the ascending run of the apron, and twisting means associated with the gatherer.

20. In a straw-twine-making mechanism for self-binders, the combination with the lower elevator-apron formed in sections, of a supporting-frame arranged in the interval between the apron-sections, an endless strand-gatherer arranged upon said supporting-frame and having a plurality of collecting elements, and an adjustable gage plate or slide mounted upon the supporting-frame and straddling the active collecting elements to vary the extent of the projecting portions for engagement with the straw.

21. In a straw-twine-making mechanism for self-binders, the combination with the elevator, of an endless traveling strand-gatherer operatively related to the elevator and having a series of collecting-hooks, a supporting-frame for said gatherer having rest projections upon opposite sides of the plane of the collecting-hooks, a longitudinally-bifurcated gage plate or slide straddling the active run of the gatherer, and provided with wedge inclines coöperating with said rest projections, an adjusting device connected with said plate or slide to adjust the same upon said rest projections, and twisting means associated with said gatherer.

22. In a straw-twine-making mechanism for self-binders, the combination with the lower elevator-apron, of a strand-gatherer arranged within the elevator-frame in substantially the plane of said lower apron, and comprising an endless conveyer and a plurality of tilting hooks carried thereby and having an operative projection beyond the active elevating portion of the lower apron to gather strands therefrom, a twister, and means for tripping the hooks from the straw.

23. In a straw-twine-making mechanism for self-binders, the combination with the lower elevator-apron, of a strand-gatherer arranged within the elevator-frame in substantially the plane of said apron and comprising an endless conveyer running longitudinally of the elevator and a series of tilting collecting-hooks carried by the conveyer and having an operative projection beyond the elevating portion of the apron to gather the strands therefrom, a twister, and means interposed between the twister and the gatherer for automatically tilting the hooks out of engagement with the straw.

24. In a straw-twine-making mechanism for self-binders, the combination with the lower elevator-apron, of a strand-gatherer arranged within the elevator-frame in substantially the plane of said apron and comprising a supporting-frame having a guiding-track, an endless conveyer, and a plurality of tilting collecting-hooks carried by the conveyer and having a slidable interlocking engagement with said track whereby the hooks are held at an operative projection beyond the plane of the elevating side of said apron, a twister, and means between the twister and the gatherer for tilting the hooks.

25. In a straw-twine-making mechanism for self-binders, the combination with the lower elevator-apron, of a strand-gatherer arranged within the elevator-frame in substantially the plane of said apron, and comprising a frame having a longitudinal guiding-track, an endless conveyer-chain, disposed within substantially the plane of the elevator-apron, and a plurality of tilting collecting-hooks carried by the chain, a twister, means for guiding the gathered strands from the elevator-frame to the twister, and means between the twister and the gatherer for automatically tripping the hooks.

26. In a straw-twine-making mechanism for self-binders, the combination with the elevator-aprons, of a strand-gatherer arranged within the elevator-frame, in substantially the plane of the lower apron, and comprising an endless conveyer-chain, and a series of tilting triangular hooks carried by the chain and having an operative projection beyond the elevating run of said lower apron, a twister, and means for tripping said hooks out of engagement with the strands.

27. In a straw-twine-making mechanism for self-binders, the combination with the elevator-aprons, of a strand-gatherer arranged within the elevator-frame in substantially the plane of the lower apron, and comprising a supporting-frame having a longitudinally-disposed guiding-track, an endless conveyer-chain mounted upon the frame, and a plurality of tilting hooks pivotally mounted upon the chain and provided with holding-flanges slidably interlocking with said guiding-track, a twister, and means for tripping the hooks out of engagement with the strands.

28. In a straw-twine-making mechanism for self-binders, the combination with the lower elevator-apron formed in sections, of a supporting-frame arranged in the interval between said sections, and carrying oppositely-located conveyer-wheels, said frame being also provided upon one side with a longitudinal guiding-track, an endless chain working over said conveyer-wheels, and a plurality of triangular collecting-hooks pivotally mounted upon the chain and provided with holding-flanges slidably interlocking with said track, a twister, and tripping means for said hooks.

29. In a straw-twine-making mechanism for self-binders, the combination with the lower elevator-apron formed in sections, of a strand-gatherer interposed between the apron-sections, and carrying a plurality of collecting elements, said strand-gatherer having the outer run thereof formed with a lower inclined portion extending obliquely across the space between the outer and inner runs of the apron, and twisting means associated with the gatherer, substantially as set forth.

30. In a straw-twine-making mechanism for self-binders, the combination with the elevator, of a traveling straw-gatherer comprising means for gathering strands of grain from the elevator during the elevation of the grain thereby and moving in a direction contrary to the elevating portion of the elevator, a bunching-chute located within the elevator-frame and arranged to receive the strands from the gatherer, and a twister arranged to receive the bunched material from said chute.

31. In a straw-twine-making mechanism for self-binders, the combination with the lower elevator-apron, of a strand-gatherer coöperating with said apron and traveling in a contrary direction thereto, said strand-gatherer comprising a conveyer and a plurality of collecting-hooks carried thereby, a bunching-chute arranged over a portion of the outer run of the conveyer, and around the extreme lower end thereof, a twister, and means for feeding the material from the chute to the twister, substantially as set forth.

32. In a straw-twine-making mechanism for self-binders, the combination with the lower elevator-apron of the strand-gatherer coöperating with the lower elevator-apron and comprising an endless conveyer and a plurality of tilting collecting-hooks carried thereby, a bunching-chute arranged over a portion of the active run of the conveyer and around the lower end thereof, a twister, means for tripping the hooks out of engagement with the strands, and means for resetting the hooks of the inactive run of the conveyer, substantially as set forth.

33. In a straw-twine-making mechanism for self-binders, the combination with the lower elevator-apron, of a strand-gatherer coöperating with the lower elevator-apron and comprising an endless conveyer and a plurality of collecting-hooks carried thereby, a bunching-chute arranged over a portion of the active run of the conveyer and around the lower end thereof, a feed-spout leading from the lower curved end of the bunching-chute, feeding-rollers working within said spout, and a twister arranged beyond and receiving the material from said spout, substantially as set forth.

34. In a straw-twine-making mechanism for self-binders, the combination with the elevator, of strand gathering and bunching devices both located within the elevator-frame and comprising means for gathering and bunching the strands, of a twister comprising a rotatable former, and twisting elements carried thereby.

35. In a straw-twine-making mechanism for self-binders, the combination with the elevator, of strand gathering and bunching devices both located within the elevator-frame and comprising means for gathering and bunching the strands, and a twister comprising a rotatable conical former, and yielding twisting elements carried by said former.

36. In a straw-twine-making mechanism for self-binders, the combination with strand gathering and bunching means, of a twister comprising a rotatable former having a conical bore and a circular group of twisting-springs extending beyond the contracted end of the former and each carrying a twisting-roller, substantially as set forth.

37. In a straw-twine-making mechanism for self-binders, the combination with strand gathering and bunching means, of a twister comprising a rotatable former having a conical bore and a circular group of twisting-springs extended from the contracted end of the former, and each carrying a rotatable twisting-roller, the several rollers being disposed radially with reference to the axis of rotation, substantially as set forth.

In testimony that I claim the foregoing as my own I have hereto affixed my signature in the presence of two witnesses.

THOMAS P. OWEN.

Witnesses:
JOHN H. SIGGERS,
FLORENCE E. WALTER.